April 26, 1927.
C. LAY
NUT GUARD
Filed April 1, 1926
1,625,901
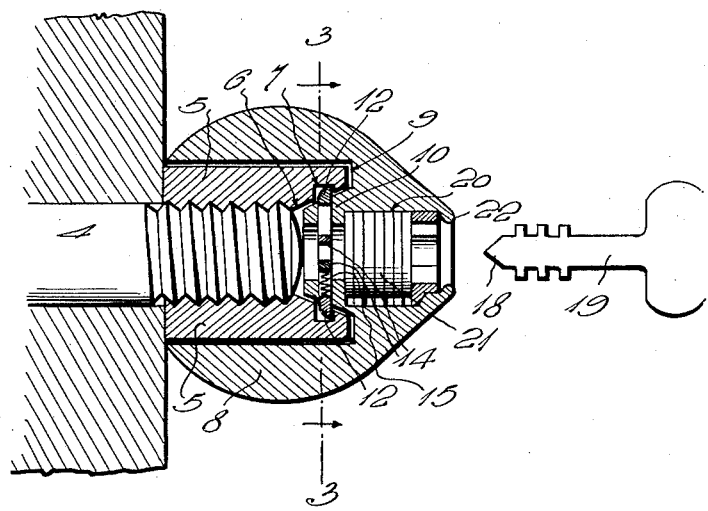
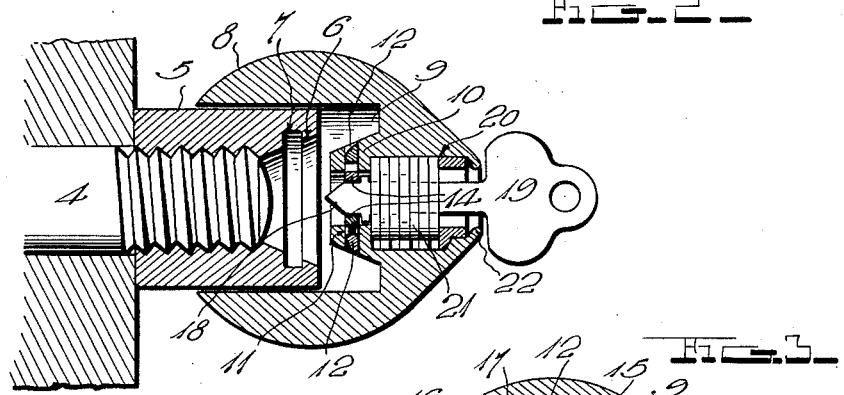
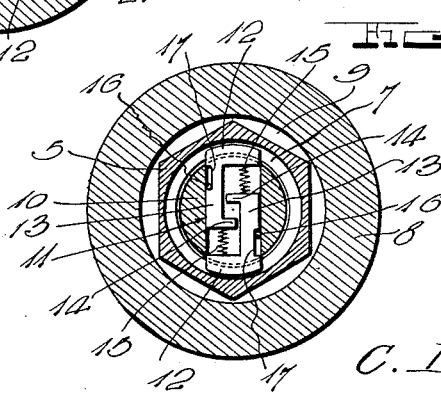
Witness
H. Woodard
Inventor
C. Lay
By H. B. Willson & Co.
Attorneys Patented Apr. 26, 1927.

1,625,901

UNITED STATES PATENT OFFICE.

CHARLES LAY, OF SAN ANTONIO, TEXAS.

NUT GUARD.

Application filed April 1, 1926. Serial No. 99,135.

The invention aims to provide a unique device to protect nuts against removal from bolts, the invention being particularly adaptable to automobiles, although by no means restricted to this field of use.

A further object is to provide a guard which surrounds the facets of the nut and is swiveled to said nut by lock controlled means, so that the guard may turn freely about the nut without having any tendency whatever to loosen the latter, and any authorized person may release the lock and remove the guard, permitting access to the nut for the purpose of removing the latter.

Another object of the invention is to provide a nut especially constructed for coaction with the improved guard.

With the foregoing in view, the invention resides in the novel subject matter hereinafter described and claimed and the description is supplemented by the accompanying drawing.

Figure 1 is a longitudinal sectional view showing the guard locked in operative position to the nut.

Figure 2 is a view similar to Figure 1 but showing the guard unlocked from the nut and partly removed.

Figure 3 is a transverse sectional view on line 3—3 of Figure 1.

In the drawing above briefly described the numeral 4 designates a bolt upon which the special nut 5 is threaded, said nut being of a thickness to leave its outer end projecting beyond the bolt end, as shown. The bore of the nut, in this projecting portion, is preferably flared as indicated at 6 and this bore portion is formed with a continuous circumferentially extending groove 7 in its wall.

A nut guarding head 8 is provided of substantially pear shape in the present disclosure although it could very well be of any other desired formation. This head is formed with a socket 9 of a size to loosely receive the nut 5 and of a depth to receive the entire width of said nut, the wall of the socket being cylindrical, so that it may turn freely about the faceted side of said nut. At the inner end or bottom of this socket, the head 8 is provided with a boss 10 which is shaped for reception in the flared end 6 of the nut bore, and this bore is formed with a transverse slot 11, which slidably receives two spring projected bolts 12, in the present disclosure, the outer end of each bolt 12 being beveled and being adapted for reception in the groove 7, so as to establish a swiveled connection between the guard and the nut. These two bolts are preferably flat and each is of L shape in the present form of construction, the two shanks 13 of these bolts engaging the edge walls of the slot 11 and being held in spaced parallel relation with each other by lugs 14, one lug being formed on each shank and slidably engaging the other shank. Coiled springs 15 are provided to project the bolts 12 to the limit permitted by appropriate stop means, such as pins 16 in the boss 10, received in notches 17 in the shanks when the two bolts are projected to the maximum. As shown in Figures 1 and 3, the lugs 14 are then spaced apart, so that when the pointed end 18 of an appropriate key 19, is forced between them, said lugs are further separated as to retract the bolts 12 and permit removal of the guard as shown in Figure 2.

The central portion of the head 8 is formed with a bore at 20 containing any desired means, such as an assembly of wards 21, for the purpose of controlling the insertion and operation of the key 19. The wards are preferably so arranged that the key must first be inserted, then turned to a certain extent, and finally forced inward to cause its end 18 to retract the bolts 12. To prevent removal of the key controlling means, the body 8 is swaged as at 22 at the outer end of the bore 20.

When the device is locked in place upon the nut, as shown in Figure 1, it is swiveled to said nut, so that it may be turned freely without in any manner loosening the nut, the bolts then sliding around the groove 7. Hence, the nut cannot be removed except by some authorized person, who may release the locking means and detach the guard, so that said nut will be readily accessible.

The details disclosed are rather simple and inexpensive, yet efficient and they are therefore preferably followed. However, within the scope of the invention as claimed, variations may be made, and the device may be used in connection with bolt heads if desired.

I claim:—

1. In combination with a nut having a recess whose wall is formed with a circumferential groove near one end of the nut; a head having a socket of a depth to receive said nut, the wall of said socket being shaped for free circumferential movement about the nut, a boss projecting from the head into said recess, a projectable and detractable bolt carried by said boss and adapted for reception in said groove when projected, and lock-controlled means whereby said bolt may be retracted.

2. In combination with a nut having a recess whose wall is formed with a circumferential groove near one end of the nut; a head having a socket to receive the nut, said head being provided at the bottom of this socket with a projecting boss for reception in said recess, said boss being formed with a transverse slot, a bolt slidable in said slot and adapted to have its other end received in said groove, a key for releasing said bolt, and means confined within the nut for controlling the insertion and operation of said key.

In testimony whereof I have hereunto affixed my signature.

CHARLES LAY.